June 30, 1970  J. E. GALLIVAN  3,518,400

METHOD OF WELDING WITH A HIGH ENERGY BEAM

Filed Aug. 30, 1968

INVENTOR
JAMES E. GALLIVAN
BY John C. Linderman
AGENT

United States Patent Office 3,518,400
Patented June 30, 1970

3,518,400
METHOD OF WELDING WITH A HIGH ENERGY BEAM
James E. Gallivan, Thompsonville, Conn., assignor to United Aircraft Corporation, East Hartford, Conn., a corporation of Delaware
Filed Aug. 30, 1968, Ser. No. 756,446
Int. Cl. B23k *15/00*
U.S. Cl. 219—121                    10 Claims

ABSTRACT OF THE DISCLOSURE

An improved method of welding by means of a high energy penetrating beam is disclosed in which an oscillatory motion in the direction of the weld seam is superimposed on the steady translational motion of the beam along the seam. The intensity of the beam is adjusted to cause complete beam penetration at all points in a slot swept by the oscillating beam and to form a weld as the oscillating beam translates along the seam.

BACKGROUND OF THE INVENTION

This invention relates to a method of welding with a high energy beam such as an electron beam. The method is particularly directed to welding materials which are difficult to weld due to the presence or formation of gas in the welds and materials which have a high heat conductivity such as copper.

The use of an electron beam for forming welds having a large depth-to-width ratio is disclosed in U.S. Pat. No. 2,987,610 issued June 6, 1961 to K. H. Steigerwald. The patent discloses a process in which the electron beam penetrates in a highly heated channel surrounded by molten material and transfers energy directly to the materials rather than rely upon heat conduction. As the penetrating beam advances along the workpiece, the molten material flows arond the beam and, upon cooling, solidifies to form the weld. Welds having a depth-to-width ratio greater than 40:1 can be formed by this deep welding process.

It has been found that certain materials are more difficult to weld than others due to special characteristics of these materials. Materials such as rimmed steel generate pockets of gas when they are heated to the molten state by the electron beam and the pockets of gas generate irregularities in the weld, particularly in thick sections, when the gas is trapped during the solidification step.

Irregularities in thick solidified welds are often found with materials which have a high heat conductivity such as copper. Even if the power and intensity of the beam is precisely controlled, it is very difficult or impossible to obtain an even distribution of the molten material in the weld prior to solidification. Irregularities are found in the form of incomplete welds at the lower bead or dished upper weld surfaces caused by overheating of the region of molten material with a loss of the material through the bottom of the seam.

In the case of sintered or porous materials, gas must be expelled from the weld seam otherwise weld irregularities are formed in a manner similar to those created in rimmed steel.

In each of the examples described above where gas contributes to poor welds, irregularities in the weld can occasionally be eliminated by passing the beam through the heavier weld sections two or more times in order to remelt the weld material and reform a weld without voids formed by the gas. This remedy is not always successful and besides, multiple passes increase both working time and power consumption.

Another approach to the problem is disclosed in U.S. Pat. No. 3,230,339 issued Jan. 18, 1966 to Opitz et al. This patent teaches that a single electron beam can effectively achieve the double-pass function by oscillating the beam in the direction of the weld seam as it advances between abutting workpieces. At the foreward position of the beam oscillations partial penetration is accomplished and at the rearward position of the beam oscillation, full penetration is completed. The present invention is thought to be an improvement over the patented process in that a more complete degassing of the welds is permitted and materials with high thermal conductivity can be penetrated with less sensitivity to beam power.

SUMMARY OF THE INVENTION

This invention relates to an improvel process of welding with a high energy beam. A charged particle beam, composed of electrons for example, is oscillated in the direction of the desired weld seam. The intensity of the beam is selected to penetrate the workpiece throughout a slot swept by the oscillating beam while the molten material behind the beam solidifies in a well as the beam translates along the desired weld seam.

Frequencies for the oscillatory motion of the beam no less than 100 cycles per second are preferred. In addition, in order to maintain a slot without excess power loss rather than distinct keyholes at the forward and rearward positions of the oscillating beam, as in the prior art, the deflection of the beam is preferably restricted to no more than .100 inch or three beam diameters. The deflection of the beam at the desired frequency and small displacement is most easily accomplished electrically while the translational motion of the oscillating beam with respect to the workpieces is accomplished by moving the worktable holding the pieces.

DESCRIPTION OF THE PREFERRED EMBODIMENT

Figure 1:
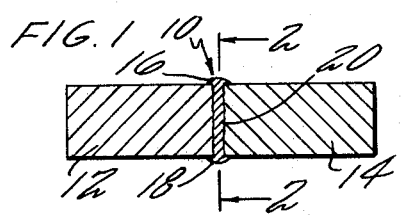
FIG. 1 is a tranverse section of a properly formed weld according to the new method.
Figure 2:
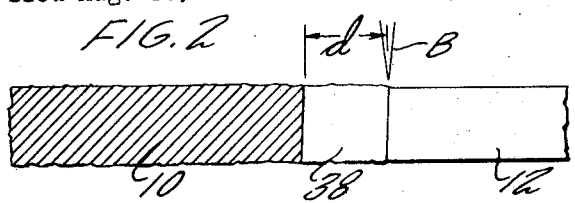
FIG. 2 is a cross section taken along the line 2—2 in FIG. 1 as the beam forms the weld according to the new method.

FIGS. 1 and 2 show transverse and longitudinal sections respectively of a properly formed weld 10 joining workpieces 12 and 14. The weld 10 has a small upper bead 16 and a small lower bead 18 with a solid interconnecting section 20.

Figure 3:
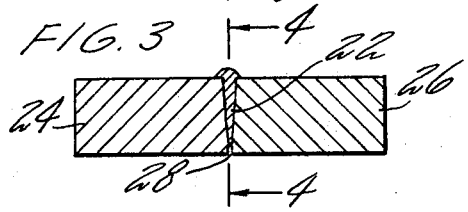
FIG. 3 is a transverse section of an incomplete weld.
Figure 4:
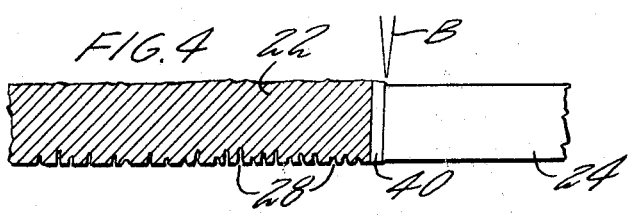
FIG. 4 is a cross section taken along the line 4—4 in FIG. 3 as the beam forms the weld according to the conventional welding process.

FIGS. 3 and 4 show an incomplete weld seam 22 between workpieces 24 and 26. In workpieces having a high thermal conductivity, the weld seam 22 is improperly formed due to the irregular flow of molten material from the leading to the trailing edge of a steadily advancing beam. It is difficult to obtain the proper distribution of molten material due to rapid heat loss from the irregularly flowing material. As a consequence, the small voids 28 appear in the lower weld bead as best seen in FIG. 4.

In the case of materials such as rimmed steel, gas is released during the melting process. With porous or sintered materials, the gas is initially present in the materials in large quantities. Welds in these materials frequently contain voids such as shown in FIGS. 3 and 4; however, the voids are not found exclusively in the lower bead but may be both in the upper bead and at location where gas becomes fully enclosed or pocketed in the central portion of the weld.

Figure 5:
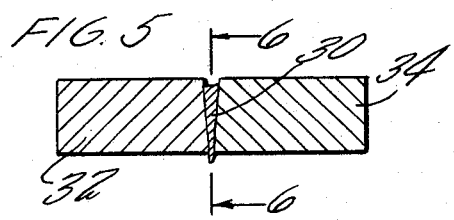
FIG. 5 is a transverse section of an undercut weld.
Figure 6:
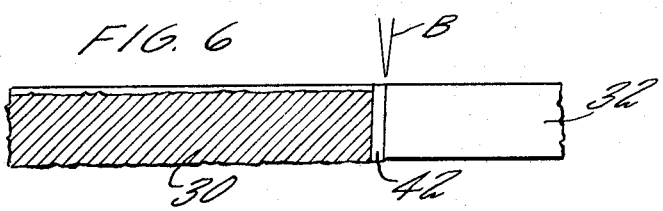
FIG. 6 is a cross section taken along the line 6—6 in FIG. 5 as the weld is formed by an overpowered beam.

It is occasionally possible to eliminate the voids in the welds shown in FIGS. 3 and 4 by increasing the beam power; however, the danger in this solution is undercutting shown in the weld seam 30 between workpieces 32 and 34 of FIGS. 5 and 6. Undercutting develops when excess energy from the beam overheats the workpieces. The excess energy causes a large amount of molten material to be formed around the highly heated channel. When the quantities of molten material become so large that surface tension can no longer support the material against gravity, the material begins to flow out of the weld seam and forms the dished upper weld surface and the protruding lower weld surface.

Experiments have indicated that the undesirable voids and the undercutting with an overpowered beam can be circumvented by forming a molten slot in the weld seam with a beam oscillating in a direction parallel to the weld seam. The molten slot 38 is indicated in FIG. 2 and can be contrasted with the comparatively narrow channels 40 and 42 shown in the welds of FIGS. 4 and 6. The slot 38 is formed by oscillating the beam over a finite distance, $d$, as the beam, B, advances with respect to the workpieces 12 and 14. It is believed that by forming a slot with the oscillating beam in contrast to distinct keyholes or penetrations, as disclosed in U.S. Pat. No. 3,230,339, that outgassing of the weld seam in gaseous, porous or sintered materials can be more easily obtained.

Furthermore, materials having a high heat conductivity become less sensitive to the beam power. Experiments have indicated that the frequency of the beam oscillations should be relatively high in comparison to the translational speed of the mean position of the beam. Frequencies no less than 100 cycles per second are preferred for this purpose. Two significant advantages are gained by the high frequencies. First, the beam will effectively impinge several times at any given location because the mean position of the beam is advancing comparatively slowly along the weld seam. The workpieces normally advance at a speed less than one inch per second. With multiple impingements taking place at any one spot even at this rather high speed, the chances of incomplete formation of the lower weld surface as in FIGS. 3 and 4 are virtually eliminated. Second, the beam does not dwell long enough at any given position in the slot to overheat the workpieces and cause a loss of molten material as shown in FIGS. 5 and 6.

Experiments have also indicated that the beam deflection, $d$, should not be too large. Deflections which are in the order of .100 inch or two to three beam diameters have proven successful with materials having a high thermal conductivity. In one case, successful welds were formed between copper workpieces .300 inch thick by oscillating the beam through the distance, $d$, equal to .100 inch at a frequency of 800 cycles per second. A slot, rather than distinct keyholes, can be maintained at larger deflections; however, it is felt that the maintenance of a large slot contributes to increased power demands with little improvement in the weld. With large deflections the beam will penetrate the central portion of the slot simply to keep the slot open. Unless large quantities of gas must be released, this action is not necessary and could contribute to overheating of the adjacent material in highly conductive metals.

Figure 7:
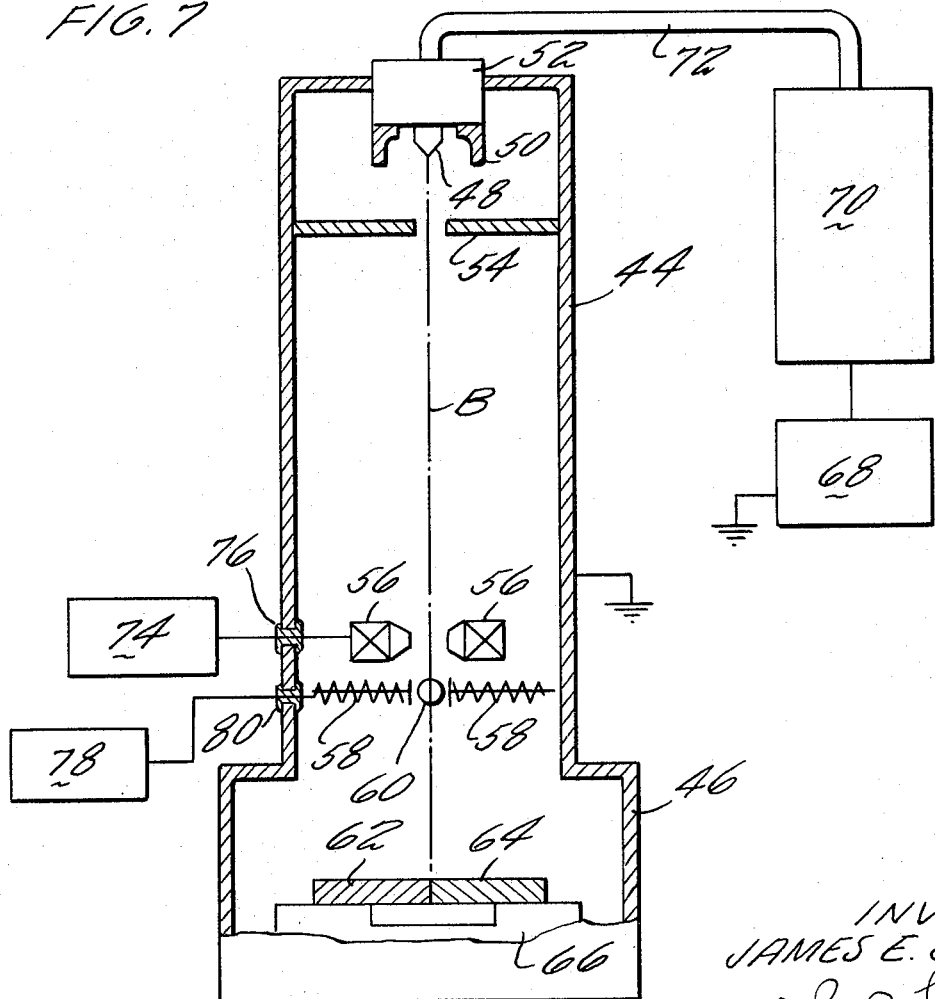
FIG. 7 is a sectional view of apparatus in schematic form for performing the new method.

The process of this invention can be performed on a conventional electron beam welder such as shown in FIG. 7. The machine consists principally of an upper housing 44 and lower housing 46. In the upper housing is a stationary electron gun consisting of a cathode 48, control electrode 50 mounted in an insulator 52 and an apertured anode 54. The electrons forming the beam B are emitted from the cathode 48 and accelerated by the anode 54 through a series of lenses and diaphragms (not shown). The lenses and diaphragms collimate the electrons into the beam which is aimed through a magnetic focussing lens 56 and two orthogonal pairs 58, 60 of electromagnetic deflection coils above the workpieces 62 and 64. Only one coil of the pair 60 is visible in the sectioned view. The deflection coils generate magnetic fields which cause the beam to deflect either transversely or longitudinally of the weld seam between workpieces 62 and 64. The workpieces are mounted on a movable worktable 66 for translation under the stationary electron beam gun. The workpieces are electrically connected through the table 66 to the housings 44, 46 which are at ground potential. By engaging the table drive mechanism (not shown), the mean position of the oscillating beam is caused to translate along the weld seam to form the weld behind the beam.

A high voltage power supply 68 provides the electrical power for the gun. Connected to the power supply is an apparatus 70 which provides the necessary equipment for generating and controlling the electron beam. The control 70 is connected by cable 72 through insulator 52 to the cathode 48 and control electrode 50. Further details of the gun operation can be found in the above-referenced U.S. Pat. No. 2,987,610.

The beam is focussed by means of the electromagnetic lens 56. The lens control 74 is connected through the housing insulator 76 to the lens 56 and provides an adjustable DC current for controlling the beam focus. By focussing the beam in the vicinity of the workpieces, the appropriate power density is achieved for penetrating the workpieces in the region swept by the beam.

In order to establish the oscillatory motion of the beam in the direction of the desired weld seam, a signal generator 78 is connected through the insulator 80 to the pair 58 of deflection coils since the charged particle beam will be deflected in a direction normal to the magnetic field between the coils. The generator 78 provides a varying current for generating a magnetic field between the pole pieces of the coils. For small deflections in the order of two or three beam diameters, the wave form of the varying current may be trapezoidal.

While a preferred operation has been described, it will be understood that numerous variations can be made without departing from the spirit and scope of the invention. For example although the oscillatory motion of the beam with respect to the workpiece is generated by the deflection coils 58 and the translation of the mean position of the beam along the weld seam is accomplished by movement of the worktable 66, it is readily apparent that a steadily increasing DC current could be superimposed on the alternating output current of generator 78 to cause the beam to translate across the workpieces while the worktable remains stationary. Furthermore, combinations of both workable motions with respect to the stationary electron beam gun and a DC deflection current on coils 58 could be employed if desired. The invention, therefore, is not limited to the specific operations described but may be used in other ways without departing from its spirit as defined by the following claims.

I claim:
1. The method of welding along a seam between abutting workpieces by means of a high energy beam comprising:
   directing the beam at the workpieces to impinge on the workpieces in the plane of the seam;
   advancing the beam relative to the workpieces in the direction of the seam;
   superimposing a parallel oscillatory motion on the advancing motion of the beam; and setting the beam intensity to completely penetrate the workpieces in a highly heated slot swept by the oscillatory motion of the beam and to simultaneously form a weld behind the beam as the oscillating beam advances along the seam.

2. The method of claim wherein the oscillatory motion of the beam is no greater than .100 inch.

3. The method of claim 1 wherein the frequency of the oscillatory motion is no less than 100 cycles per second.

4. The method of claim 1 wherein the oscillatory motion of the beam on the workpieces is no greater than .100 inch and the cyclic frequency of the oscillatory motion is no less than 100 cycles per second.

5. The method of welding workpieces with a high energy beam of charged particles comprising:
   aiming the beam at the workpieces in the plane of the desired weld;
   oscillating the beam with respect to the workpieces in the plane of the desired weld;
   setting the beam intensity to completely penetrate the workpieces along the sweep of the oscillating beam so that beam energy is transmitted directly to the material adjacent the beam; and
   moving the mean position of the beam relative to the workpieces along the seam to form a weld.

6. The method of claim 5 wherein the oscillating frequency of the beam is no less than 100 cycles per second.

7. The method of claim 5 wherein the sweep of the oscillating beam on the workpieces is no greater than three beam diameters.

8. The method of claim 5 wherein:
   the beam is an electron beam aimed at the workpieces from a stationary electron gun,
   oscillating the beam is accomplished by cyclically deflecting the beam with respect to the gun; and
   moving the mean position of the beam is accomplished by translation of the workpieces past the gun.

9. The method of claim 8 wherein the deflection of the beam on the workpiece sweeps a path no greater than .100 inch.

10. The method of claim 9 wherein the deflection frequency is no less than 100 cycles per second.

References Cited

UNITED STATES PATENTS

| | | | |
|---|---|---|---|
| 3,033,974 | 5/1962 | Schleich et al. | 219—117 |
| 3,131,289 | 4/1964 | Hansen | 219—121 |
| 3,134,013 | 5/1964 | Opitz et al. | 219—121 |
| 3,134,892 | 5/1964 | Opitz et al. | 219—69 |
| 3,230,339 | 1/1966 | Opitz et al. | 219—121 |

JOSEPH V. TRUHE, Primary Examiner

R. E. O'NEIL, Assistant Examiner

U.S. Cl. X.R.

219—117